Patented May 5, 1931

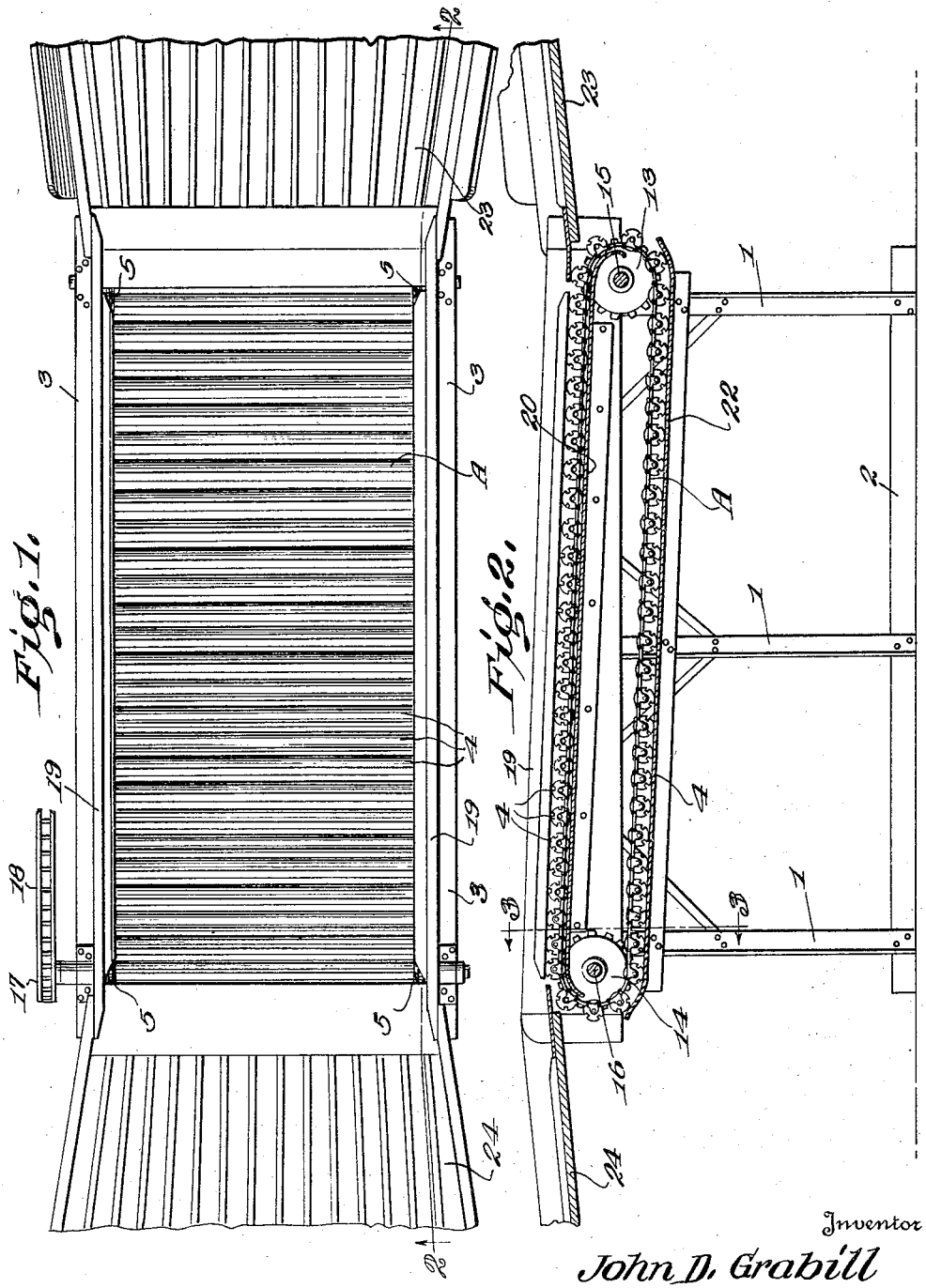

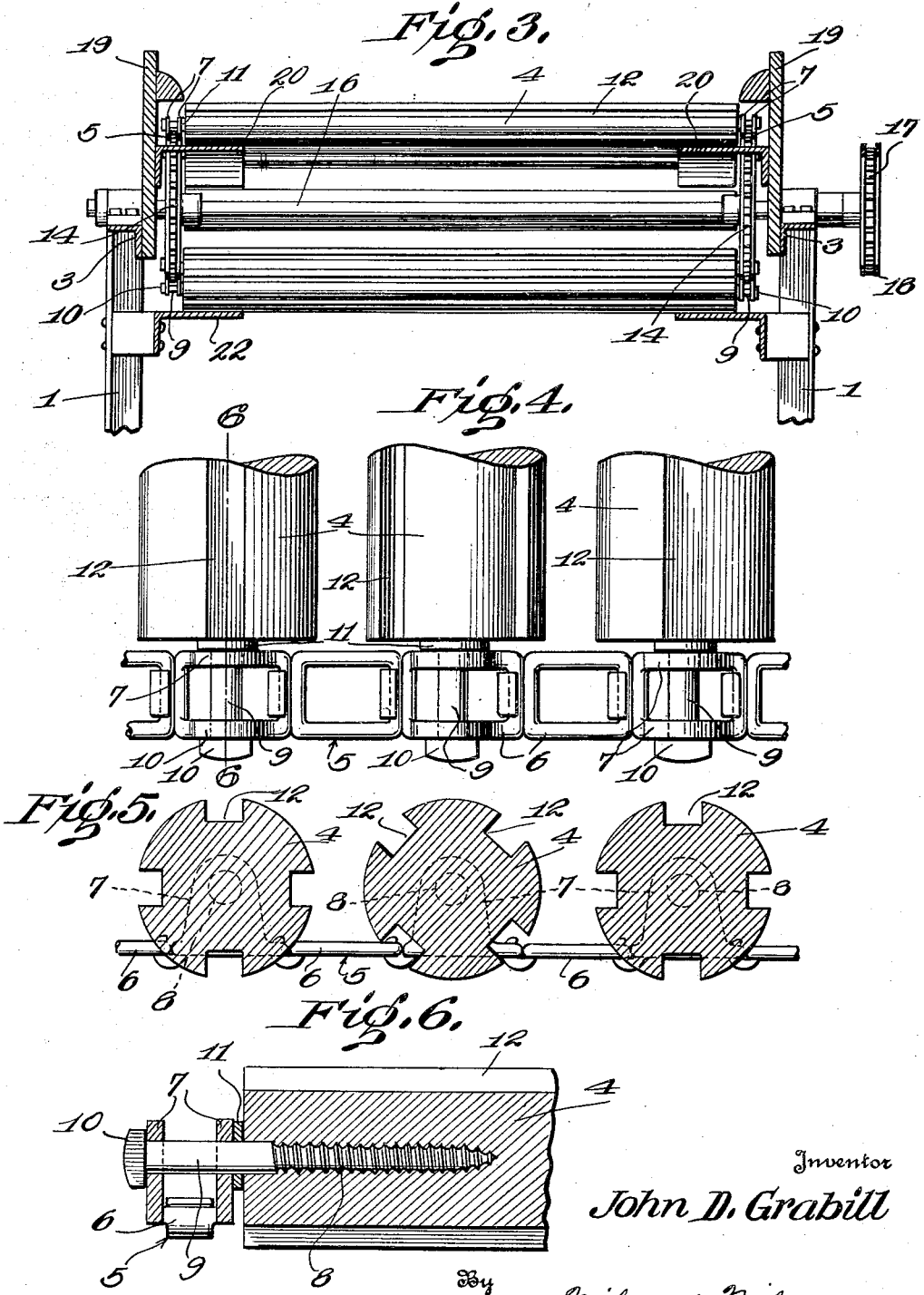

1,804,096

UNITED STATES PATENT OFFICE

JOHN D. GRABILL, OF WOODSTOCK, VIRGINIA

SORTING APPARATUS

Application filed February 5, 1929. Serial No. 337,689.

This invention relates to improvements in sorting apparatus for fruits and vegetables, especially apples and the like. The invention more particularly has to do with sorting apparatus of the type in which an endless traveling conveyor comprising a series of independently rotatable rollers arranged in parallel relation, is employed to support and carry along the articles to be sorted and at the same time turn the same to present all sides thereof for inspection, the culls or articles having imperfections being removed by hand from the conveyor.

In sorting apparatus of the class referred to it is advantageous to use rollers of relatively small size in diameter for the conveyor. It has heretofore been proposed to employ cylindrical rollers having smooth continuous outer faces but it has been found that small size cylindrical rollers having continuous smooth outer faces do not satisfactorily turn the fruit or vegetables, particularly in the case of larger fruit or vegetables, the rollers during rotation slipping past the apples or the like without turning the same. It has also been proposed to employ conveyor rollers having corrugated or scalloped outer faces but such constructions while operating more efficiently than the smooth cylindrical form of roller to impart turning movement to the fruit, are seriously objectionable because they are too severe on the fruit, the corrugated or scalloped rollers presenting too much roughened or uneven surface, resulting in injury to the soften fruit and serious losses on this account.

An object of the present invention is to overcome the difficulty referred to, to provide an improved, simple, practical construction of conveyor roller and conveyor that will function in an efficient way to impart turning movement to the fruit or vegetables while moving the same along without injury thereto.

The invention, with other objects and advantages thereof, and the particular construction, combination and arrangement of parts comprising the same, will be understood from the hereinafter contained detail description when considered in connection with the accompanying drawings forming part hereof and illustrating one embodiment of the invention.

In the drawings:

Figure 1 is a top plan view of a sorting apparatus constructed in accordance with the present invention.

Fig. 2 is a vertical longitudinal section on the line 2—2 of Figure 1 looking in the direction of the arrow.

Fig. 3 is a transverse section on the line 3—3 of Figure 2.

Fig. 4 is a detail top plan view, on an enlarged scale, of a portion of the conveyor.

Fig. 5 is a detail view, on an enlarged scale, of a portion of the conveyor with parts shown in section and side elevation.

Fig. 6 is a detail view illustrating the manner of connecting and mounting the rollers upon the sprocket chains.

The invention comprehends a sorting apparatus including a conveyor comprising a series of rotatable rollers arranged in parallel relation with means for rotating the rollers during the travel of the conveyor, the rollers being cylindrical in form and provided in their outer faces with a plurality of relatively narrow longitudinal grooves spaced a substantial distance apart, the majority of the roller face formed by the portions thereof between said grooves being smooth and continuous whereby sufficient engagement of the fruit by the rollers is provided for to efficiently turn the fruit while avoiding injury to the same.

While a specific embodiment of the invention, which has proven satisfactory in practice, is illustrated in the drawings, it will of course be understood that changes and modifications may be made in the particular construction shown, and the invention carried out in other forms as will appeal to those skilled in the art and falling within the scope of the appended claims, without departing from the spirit of the invention.

Referring to a detail description of the particular embodiment of the invention shown in the drawings, the frame of the machine, which may be of any suitable construction, is here shown as comprising pairs of uprights 1 connected by upper and lower longitudinal bars 2—3.

The sorting conveyor, designated generally A in Figures 1 and 2 of the drawings, comprises a plurality of rollers 4 connected together in an endless series in spaced parallel relation by a pair of sprocket chains 5 disposed at either side thereof and composed of pivotally connected links 6. Alternate links of the chains 5 are provided at their outer sides with apertured projections 7 to cooperate with pins on the ends of the rollers 4 to constitute connecting means and for rotatably mounting the rollers 4 upon the sprocket chains 5. These pins are in the form of screws, each having a threaded end portion 8, a smooth section 9 forming a journal, and a head 10, said pins being engaged with the apertured projections 7 of the chains 5 as shown, and secured to the roller 4 by screwing the same into the ends thereof, the apertured projections 7 of the links 6 constituting bearings for the journal sections 9 of said pins. 11 designates washers on the smooth portions 9 of said pins between the ends of the rollers 4 and the projection 7.

The rollers are cylindrical and each provided in its outer face with a plurality of relatively narrow longitudinal grooves 12, the major part of the surface of said rollers formed by the portions thereof lying between the grooves 12 being smooth and continuous. The rollers 4 are relatively small in diameter. In practice it has been found advantageous to employ rollers two inches in diameter. The grooves 12 of the rollers are rectangular shape and preferably straight, as shown, said grooves extending throughout the full length of the rollers.

The supporting and driving means for the conveyor A comprises pairs of sprocket wheels 13, 14, fixed on shafts 15, 16, mounted for rotation in suitable bearings at either end of the frame, the pair of sprocket chains 5 being trained over the pairs of sprocket wheels 13, 14. 17 designates a driving sprocket wheel fixed on the outer end of the shaft 16 to which rotary motion is transmitted by any suitable means for instance a chain 18. The arrangement of the shafts 15, 16 and pairs of sprockets 13, 14, is preferably, as shown, so that the upper stretch of the conveyor A extends at a slight upward inclination from front to rear. 19 designates side boards projecting upwardly from the upper longitudinal rails 3. Secured to and extending inwardly from the side boards 19 are plates 20 which support the upper active stretch conveyor A and also serve to cause rotation of the rollers 4 of the upper lap of the conveyor during the forward travel thereof. Secured to the sides of the frame are plates 22 to support the lower stretch of the conveyor A. 23 designates a feed table leading to the forward end of the conveyor A, and 24 is a receiving table at the discharge end.

As will be understood, when the shaft 14 is driven through the driving sprocket 17 movement will be imparted to the conveyor A, and the rollers 4 in the upper stretch of the conveyor will be caused to rotate through their engagement with the plates 20. Fruit or vegetables placed on the feed table 23 and fed therefrom onto the forward end of the conveyor A will be carried along and at the same time turned over by the rotating rollers 4.

The particular construction of the rollers 4, cylindrical in shape and provided in its outer face with a plurality of relatively narrow longitudinal grooves spaced a substantial distance apart, and with the major part of the roller surface smooth and continuous, operates in a highly satisfactory way to turn the fruit, the relatively narrow grooves of the rollers 4 providing for the necessary engagement between said rollers and the fruit, so that the fruit is turned in an efficient way by the rotation of the rollers, and at the same time the construction is of a character to not bruise or otherwise harm the fruit. The particular roller structure is of a simple nature, inexpensive to manufacture, and while specially formed to provide for a more efficient engagement and turning of the fruit, the structure is such as to permit of the use of a simple flat surface or plate as the means for imparting rotary movement thereto. It will also be noted that the special form of screw pins on the ends of the rollers 4 constitute simple and efficient means for connecting the rollers 4 and to rotatably mount the same upon the side sprocket chains, the particular screw pin construction facilitating the quick and easy assembly of the conveyor parts and the production of the conveyor at low cost.

I claim:

1. A sorting apparatus of the class set forth including an endless conveyor comprising a plurality of rotatable rollers arranged in parallel relation, each of said rollers being cylindrical and provided in its outer face with a plurality of relatively narrow longitudinal grooves spaced substantial distances from each other, the distance between successive grooves, in each instance, being considerably greater than the width of each of said grooves, means for supporting and imparting travel to the endless conveyor, and means for rotating the rollers.

2. A sorting apparatus of the class set forth including an endless conveyor comprising a plurality of rotatable rollers arranged in parallel relation, each of said rollers being cylindrical and provided in its outer face with a plurality of relatively narrow longitudinally extending grooves rectangular shaped in cross section and spaced substantial distances from each other, the distance between successive grooves, in each instance, being considerably greater than the width of each of said grooves, means for imparting travel to the endless conveyor, and means for rotating the rollers.

3. A sorting apparatus of the class set forth including an endless conveyor comprising a plurality of rotatable rollers arranged in parallel relation, each of said rollers being cylindrical and provided in its outer face with a plurality of relatively narrow straight longitudinal grooves spaced substantial distances from each other, the distance between successive grooves, in each instance, being considerably greater than the width of each of said grooves, means for imparting travel to the endless conveyor, and means for rotating the rollers.

4. A sorting apparatus of the class set forth comprising an endless conveyor having a plurality of rotatable rollers arranged in parallel relation, each of said rollers being cylindrical and of substantially the same diameter throughout and being provided in its outer face with a plurality of relatively narrow longitudinal grooves spaced substantial distances from each other, the distance between successive grooves, in each instance, being considerably greater than the width of each of said grooves, means for imparting travel to the endless conveyor, and means for rotating the rollers.

5. A sorting apparatus of the class set forth including an endless conveyor comprising a series of rollers arranged in spaced parallel relation, a pair of sprocket chains disposed at opposite sides of the series of rollers connecting the same together for independent rotation, pairs of supporting wheels engaged by the sprocket chains, each of said rollers being cylindrical and of the same diameter throughout and provided in its outer face with a plurality of relatively narrow longitudinal grooves spaced substantial distances from each other, the distance between successive grooves, in each instance, being considerably greater than the width of each of said grooves, and flat surfaces arranged in the path of travel of one stretch of said conveyor to be engaged by end portions of the rollers to independently rotate the rollers as the same move along and contact therewith.

In testimony whereof I hereunto affix my signature.

JOHN D. GRABILL.